July 7, 1942.  L. J. RADERMACHER  2,289,069
SPINDLE AND TOOL COUPLING
Filed July 3, 1940

INVENTOR
Lawrence J. Radermacher
BY
Fred A. Parsons
ATTORNEY

Patented July 7, 1942

2,289,069

UNITED STATES PATENT OFFICE 2,289,069

SPINDLE AND TOOL COUPLING

Lawrence J. Radermacher, Hales Corners, Wis., assignor to Stokerunit Corporation, Milwaukee, Wis., a corporation of Wisconsin Application July 3, 1940, Serial No. 343,760

11 Claims. (Cl. 77—58)

This invention relates to spindle and tool coupling means, and more particularly for rotation of cutting tools in machine tools of the type generally termed boring machines.

In various machine tools and particularly in boring machines it is desirable to provide the rotatable tool spindle with coupling means for tools, such as drills, reamers and the like, to rotate coaxially with the spindle and also to provide for the lateral adjustment of other tools to change the work diameter effected thereby.

It is an object of the invention to effect improved spindle and tool coupling means providing for both concentric and laterally adjustable operation of the tools. A further object is to provide improved means for lateral tool adjustment and still other objects will be apparent from the specification.

The invention consists of the construction and combination of parts herein illustrated, described and claimed, and in such modifications of the structure illustrated and described as are equivalent to the structure claimed.

The same reference characters are used to indicate the same parts throughout, and in the drawing.

Figure 1:
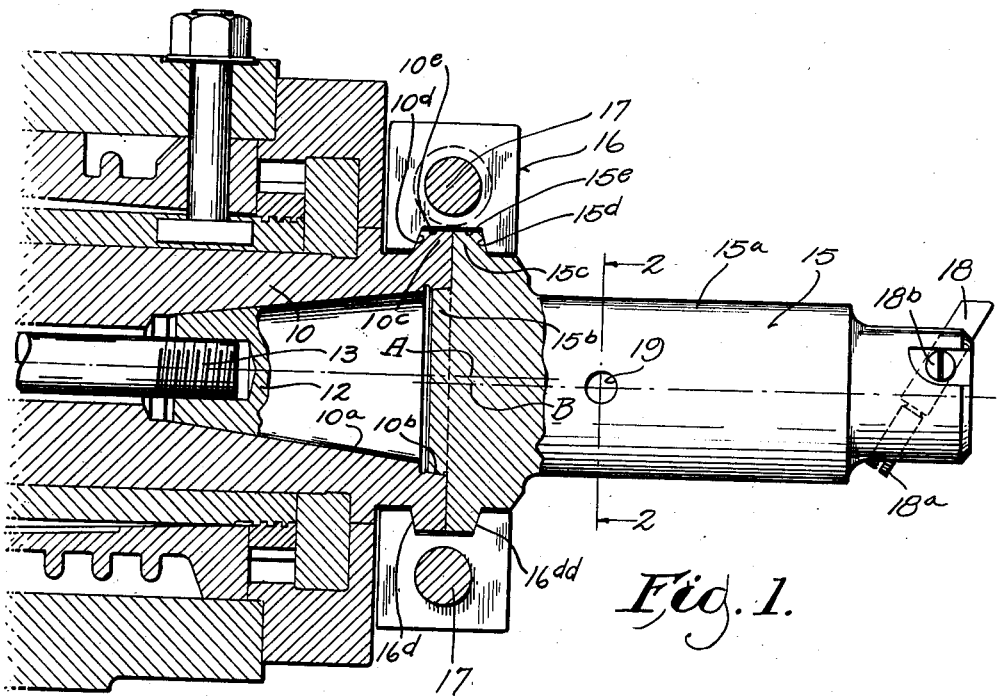
Figure 1 shows a spindle and tool coupling incorporating the invention, mostly in section along line 1—1 of Fig. 2.

A tool spindle 10 is supported for rotation in suitable bearings and driven through suitable transmission mechanism, not shown. The machine also provides a suitable work support, and suitable guides and actuating mechanism, not shown, for relative bodily reciprocatory movement of the spindle and work support in a path parallel to the spindle axis.

For the coupling with the spindle of tools such as drills, reamers and the like, the spindle provides a conically tapered bore 10a coaxial with the spindle, in which a complementary tapered shank of the tool, of which a portion is shown at 12, may be seated and retained by a draw rod such as 13, for aligning and driving the tool. It will be understood that the tool shown at 12 is usable alternatively with the tool carrier and boring tool to which this invention particularly relates and which are now to be described At the front end the spindle provides a conical tapered bore 10b which is axially parallel to the spindle axis A, but eccentric relative thereto, as indicated at B. A boring tool 15 provides a generally cylindrical extension or bar portion 15a, and a conical shank portion 15b complementary to the eccentric conical bore 10b and fitted therein, the conical portion 15b and extended cylindrical portions of the boring bar being coaxial with the eccentric axis B.

The spindle and boring bar also provide opposed abutment flange portions 10c, 15c mutually abutting along a plane which is vertical to the axes A, B; the abutment portions providing oppositely conical side or end faces 10d, 15d and cylindrical exterior faces 10e, 15e; the conical end faces and cylindrical exteriors being coaxial with the eccentric axis B.

Clamp ring means generally indicated as 16 includes ring portions 16a, 16b which may be adjusted toward one another by clamp screws such as 17, 17. The clamp ring also provides a bore having oppositely conical faces 16d, 16dd respectively complementary to the conical faces 10d, 15d and abutting therewith. Except as the bore of the clamp ring abuts at the conical faces as mentioned, there is clearance at all points thereof. The clamp ring bore is coaxial with the eccentric axis B while the exterior of the clamp ring, partly in order to effect balanced weight for the clamp means, is coaxial with the spindle axis A, the clamp ring being prevented from rotation relative to spindle 10 by the means of a key or pin 20 engaging a suitable key slot 20a in the spindle. The construction described operates to rigidly clamp the boring tool 15 in any position of angular adjustment relative to the spindle 10 when the clamp screws 17 are tightened, the abutting flange portions being forced together simultaneously with the pressure engagement of the shank 15b in the conical bore 10b.

The boring tool 15 carries a cutting tool 18 suitably removably fixed therewith and which, by reason of the eccentric relation of the axes A, B, will cut various diameters on a work piece during rotation of spindle 10 accordingly as the tool is adjusted to various angular positions, relative to the spindle 10, by loosening the clamp screws 17 and rotating the conical shank portion 15b in the complementary tapered bore 10b. For effecting such rotation a spanner wrench, not shown, may be applied to a drilled hole 19.

Figure 2:
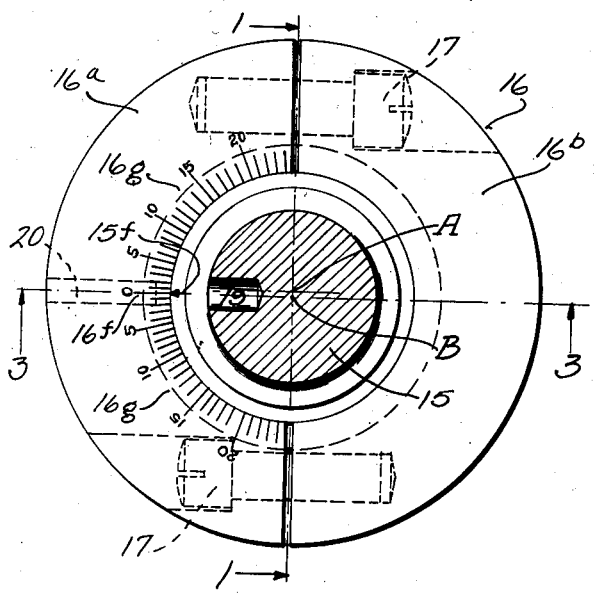
Figure 2 is a front elevation of the device, partly in section along line 2—2 of Fig. 1.
Figure 3:
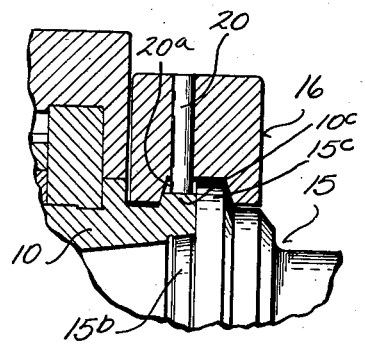
Figure 3 is a partial section taken along line 3—3 of Fig. 2.

The cutting tool 18 will bore to a minimum diameter when the cutting edge stands in the angular position relative to axes A, B, as indicated in Fig. 1, and will cut to maximum diameter when turned to directly opposite angular position. For indicating the adjustment point effecting minimum cutting diameter the boring tool is provided with an indicator such as 15f, Fig. 2, readable against a zero mark such as 16f on the face of the clamp ring, the clamp ring being further provided with scales or markings such as 16g, 16g against which the indicator 15f is readable to show the adjustment of the boring tool in either direction from the zero, or minimum cutting diameter, position. The graduations 16g are, preferably, spaced and marked to indicate increments of increase in the diameter of the bore cut by tool 18 in the various indicated positions. Tool 18 may be adjusted outwardly by a screw 18a and clamped in adjusted position by a screw 18b, whereby to determine the work diameter cut by the tool when in its zero position of the angular adjustment of the tool relative to the spindle.

It will be understood that, while the coupling device is here illustrated in connection with a boring tool coupled with the spindle 10, the device may also be similarly used for the coupling of a tool for turning exterior surfaces on a work piece.

What is claimed is:

1. In a machine tool the combination of a rotatable spindle having a conical bore axially parallel with the spindle axis and eccentric relative thereto, the larger end of said bore being at the front end of the spindle, a tool having a conical shank portion complementary to said eccentric bore and fitting within the bore for transverse location and angular adjustment of the tool relative to said spindle, said spindle and tool providing complementary flange portions mutually abutting in a plane vertical to the spindle axis and at the front end of the spindle, clamp means engaged over said flange portions for pressure engagement of said abutting flange portions in various positions of said angular adjustment, and indicator means determinative of the amount of said angular adjustment.

2. In a machine tool the combination of a rotatable spindle having a conical bore axially parallel with the spindle axis and eccentric relative thereto, the larger end of said bore being at the front end of the spindle, a tool having a conical shank portion complementary to said eccentric bore and fitting within the bore for transverse location and angular adjustment of the tool relative to said spindle, said spindle and tool providing complementary flange portions mutually abutting in a plane vertical to the spindle axis and at the front end of the spindle, said flange portions of the spindle and tool respectively providing oppositely conical exterior clamping surfaces each coaxial with the eccentric axis of said conical bore, and a clamp ring device contractibly engaging said conical clamping surfaces whereby to clamp said abutting flange faces together in various positions of said angular spindle and tool adjustment.

3. In a machine tool the combination of a rotatable spindle having a bore at the front end thereof axially parallel with the spindle axis and eccentric relative thereto, a tool having a shank portion fitted within said eccentric bore for transverse location and angular adjustment of the tool relative to the spindle, said spindle and tool providing complementary flange portions mutually abutting in a plane vertical to the spindle axis and at the front end of the spindle, said flange portions of the spindle and tool providing oppositely conical exterior clamping surfaces each coaxial with the eccentric axis of said conical bore, and a clamp ring device contractibly engaging said conical clamping surfaces whereby to clamp said abutting flange surfaces together in various positions of said angular tool and spindle adjustment.

4. In a machine tool the combination of a rotatable spindle having a bore at the front end thereof axially parallel with the spindle axis and eccentric relative thereto, a tool having a shank portion fitted within said eccentric bore for transverse location and angular adjustment of the tool relative to the spindle, said spindle and tool providing complementary flange portions mutually abutting in a plane vertical to the spindle axis and at the front end of the spindle, external clamp means adjustable and in pressure engagement over said abutting flange surfaces whereby to clamp said spindle and tool in various positions of said angular adjustment, and indicator means determinative of the amount of said angular adjustment.

5. In a machine tool the combination of a rotatable spindle having a conical bore axially parallel with the spindle axis and eccentric relative thereto, the larger end of said bore being at the front end of the spindle, a tool having a conical shank portion complementary to said eccentric bore and fitting within the bore for transverse location and angular adjustment of the tool relative to said spindle, and clamp means for fixing the relative angular adjustment position of said spindle and tool including complementary flange portions respectively on said spindle and tool and providing mutually abutting pressure surfaces in a plane vertical to the spindle axis and at the front end of the spindle.

6. In a machine tool the combination of a rotatable spindle having a conical bore axially parallel with the spindle axis and eccentric relative thereto, the larger end of said bore being at the front end of the spindle, a tool having a conical shank portion complementary to said eccentric bore and fitting within the bore for transverse location and angular adjustment of the tool relative to said spindle, and clamp means for fixing the relative position of said spindle and tool in various positions of said angular adjustment including means for relative movement of said shank portion in the direction of the smaller end of said conical eccentric bore whereby to effect pressure engagement of the shank portion and the inner surface of the tool.

7. In a machine tool, the combination with a spindle rotatable upon its axis and provided in its end with a tapered bore having an axis parallel to and offset from the axis of the spindle, said spindle having an annular terminal flange substantially concentric with said bore and eccentric respecting the axis of the spindle, a spindle extension having a tapered boss rotatably fitting in the bore of the spindle and also having an annular flange complementary to the spindle flange, at least one of said flanges having an outwardly tapering surface, clamp means embracing the respective flanges of the spindle and the spindle extension and provided with means for tightening it upon said flanges, whereby to fix the angular position of the spindle extension respecting the spindle while at the same time forcing the extension boss into the tapered bore of the spindle; and a tool support on said spindle extension.

8. In a machine tool, the combination with a rotatable spindle having a tapered bore at its front end axially parallel with the spindle axis and offset eccentrically with respect thereto, of a spindle extension having its end in abutment with the end of the spindle and provided centrally with a tapered boss complementary to the bore of the spindle and seated therein, a tool projecting laterally from said spindle extension and adjustable as to its radial projection from the spindle axis by the rotation of the extension boss in the spindle bore, and complementary flanges on the abutting end portions of the spindle and spindle extension, said flanges having frusto-conical clamp surfaces and a clamping ring comprising a plurality of sections having complementary surfaces engaged with the clamping surfaces of the spindle and spindle extension, said clamping ring being provided with means for drawing its several sections together upon the clamp surfaces of the spindle and spindle extension, whereby to hold said extension rigidly respecting said spindle while urging the extension boss into the bore of the spindle.

9. The combination with a spindle rotatable upon its axis and provided at its end with an annular flange eccentric respecting the spindle axis, of a spindle extension having a flange complementary to the flange of the spindle and comprising a tool carrier, at least one of said flanges being frusto-conically tapered, and a multiple section clamping ring having in its interior periphery flanges complementary to the respective flanges of the spindle and the spindle extension, and means for drawing the sections of said ring together upon the flanges of the spindle and the spindle section, whereby to clamp the spindle extension rigidly to the spindle in any desired position of angular adjustment, said clamping ring providing between its flanges a guideway in which the flange of the spindle extension is rotatably adjustable when said clamping ring is loosened.

10. The device of claim 9 in which said ring has its external periphery concentric with said spindle, said ring being provided with means fixing it against angular displacement respecting the spindle.

11. The combination with a spindle rotatable upon its center and provided with a terminal socket of circular cross section having its center slightly eccentric with respect to the spindle center, a peripheral flange means on the spindle, a tool carrier having a shank complementary to said socket and rotatable therein with its center slightly eccentric respecting the spindle center, said tool carrier having a shoulder outside of said shank in face abutment with the end of the spindle and being provided with peripheral flange means complementary to the flange means of the spindle, external clamping means spanning the flange means of the spindle and carrier and securing the carrier to the spindle while permitting rotative adjustment of the carrier respecting the spindle upon the eccentric axis of said socket, and a tool mounted on the carrier and having a working edge at a radial offset from the carrier shank center materially exceeding the eccentricity of the carrier shank center with respect to the spindle center, whereby the spindle center will at all times lie well within the path described by the cutting edge of the tool in the adjustment of the tool and carrier unitarily about the eccentric axis of said socket, the said cutting edge being therefore exposed at all times for operative engagement with the work to which it may be applied, irrespective of such adjustment.

LAWRENCE J. RADERMACHER.